United States Patent
Renac et al.

(10) Patent No.: US 9,900,373 B2
(45) Date of Patent: Feb. 20, 2018

(54) SYSTEM FOR PROVIDING A SERVICE, SUCH AS A COMMUNICATION SERVICE

(75) Inventors: Paul Renac, Lannion (FR); Jean-Louis Le Roux, Lannion (FR)

(73) Assignee: ORANGE, Paris (FR)

( * ) Notice: Subject to any disclaimer, the term of this patent is extended or adjusted under 35 U.S.C. 154(b) by 305 days.

(21) Appl. No.: 13/258,942

(22) PCT Filed: Mar. 23, 2010

(86) PCT No.: PCT/FR2010/050522
§ 371 (c)(1),
(2), (4) Date: Dec. 7, 2011

(87) PCT Pub. No.: WO2010/109128
PCT Pub. Date: Sep. 30, 2010

(65) Prior Publication Data
US 2012/0086805 A1 Apr. 12, 2012

(30) Foreign Application Priority Data
Mar. 23, 2009 (FR) ...................................... 09 51839

(51) Int. Cl.
*H04L 29/08* (2006.01)
*H04L 12/66* (2006.01)
(Continued)

(52) U.S. Cl.
CPC ............ *H04L 67/025* (2013.01); *H04L 12/66* (2013.01); *H04L 67/12* (2013.01); *H04L 67/14* (2013.01);
(Continued)

(58) Field of Classification Search
None
See application file for complete search history.

(56) References Cited

U.S. PATENT DOCUMENTS

2002/0069278 A1* 6/2002 Forslow .............. H04L 63/0227 709/225
2002/0116523 A1* 8/2002 Warrier ............. H04L 29/12009 709/238

(Continued)

FOREIGN PATENT DOCUMENTS

WO 00/36807 A2 6/2000

OTHER PUBLICATIONS

French Search Report and Written Opinion dated Jul. 28, 2010, from corresponding International Application No. PCT/FR2010/050522, filed Mar. 23, 2010.

(Continued)

*Primary Examiner* — Hung Dang
*Assistant Examiner* — Sunghyoun Park
(74) *Attorney, Agent, or Firm* — David D. Brush; Westman, Champlin & Koehler, P.A.

(57) ABSTRACT

A system an method are provided for providing a service, such as telemonitoring, in particular via the Internet. The system includes a terminal device of a communication network having elements for establishing a connection with a service provider device through at least the communication network, and an application server able to receive a service request from the service provider device on the connection. Thus, the terminal device can make itself accessible to a service provider device as soon as it is put into service. Furthermore, the fact that the terminal device is at the initiative of the connection for this service secures access to the data of the terminal device relating to this service.

10 Claims, 3 Drawing Sheets

(51) Int. Cl.
*H04N 7/18* (2006.01)
*H04L 29/06* (2006.01)

(52) U.S. Cl.
CPC .............. *H04L 67/16* (2013.01); *H04L 67/42*
(2013.01); *H04N 7/181* (2013.01)

(56) References Cited

U.S. PATENT DOCUMENTS

| | | | | |
|---|---|---|---|---|
| 2003/0013463 | A1* | 1/2003 | Yen | G06Q 10/10 455/461 |
| 2003/0145093 | A1* | 7/2003 | Oren | G06F 17/30109 709/229 |
| 2003/0206523 | A1* | 11/2003 | Lu | 370/231 |
| 2004/0008249 | A1* | 1/2004 | Nelson | H04N 7/147 348/14.09 |
| 2004/0080624 | A1 | 4/2004 | Yuen | |
| 2004/0236582 | A1* | 11/2004 | Yoshikai | H04L 29/06027 704/278 |
| 2004/0240407 | A1* | 12/2004 | Ehrsam | H04L 29/06027 370/328 |
| 2004/0252197 | A1* | 12/2004 | Fraley | H04N 5/23203 348/207.1 |
| 2006/0136972 | A1* | 6/2006 | Metzger | G08B 13/19689 725/105 |
| 2006/0161662 | A1* | 7/2006 | Ng | H04L 12/2823 709/227 |
| 2007/0078978 | A1* | 4/2007 | Arnold et al. | 709/224 |
| 2008/0106597 | A1 | 5/2008 | Amini et al. | |
| 2008/0158336 | A1* | 7/2008 | Benson | H04L 65/602 348/14.08 |
| 2008/0303903 | A1 | 12/2008 | Bentley et al. | |
| 2009/0234939 | A1* | 9/2009 | Shivaji-Rao et al. | 709/224 |

OTHER PUBLICATIONS

English translation of the International Search Report and Written Opinion dated Jul. 28, 2010, for corresponding International Application No. PCT/FR2010/050522, filed Mar. 23, 2010.

* cited by examiner

SYSTEM FOR PROVIDING A SERVICE, SUCH AS A COMMUNICATION SERVICE

CROSS-REFERENCE TO RELATED APPLICATIONS

This Application is a Section 371 National Stage Application of International Application No. PCT/FR2010/050522, filed Mar. 23, 2010 and published as WO 2010/109128 on Sep. 30, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to a system for providing a service, such as a communication service. In particular, the disclosure relates to a system for telemonitoring, in particular via the Internet.

BACKGROUND OF THE DISCLOSURE

Today's communications networks are supporting ever more numerous services using in particular the Internet and relying especially on an architecture called Client-Server.

This Client-Server architecture designates a mode of communication between several nodes of a communication network which distinguishes one or more terminal nodes (computers, IP telephones, IP camera, IP sensors, etc.) from a server node (service platform, contents server, etc.). This architecture is based on the fact that each terminal node comprises a client for dispatching requests to a server and that the server is initially passive while listening to the client terminal nodes. Depending on the applications, the server is optionally specialized as an applications server, file server, terminal server, electronic messaging server, videomonitoring platform.

In this case, the client sends requests to a server, which may be a Web server or http server, the name of the communication protocol used at the level of the application network layer. The role of the server is to ensure the processing of the request and to return the response to this request. The dialog between client and server is often carried by a transport network layer, such as the TCP layer, the name of a communication protocol: the TCP protocol. The TCP protocol is a reliable transport protocol according to RFC 793.

Thus, the respective Client and Server modes of operation of the nodes apply the transport and application network layers as a whole, which correspond, for example, to the respective TCP and HTTP protocols: the client of a service is also the client in terms of connection, the server of a service is also the server in terms of connection (The transport layers of the client and of the Server need to be connected to allow the service).

In the case of a TCP connection in a network architecture, the server operates in passive opening mode, that is to say that a point of access to a TCP connection is open, namely that it is made available to a TPC connection, and the server places itself on passive standby awaiting connection requests. The client, for its part, effects active opening, namely that it establishes a connection with the server by dispatching a request for connection to the server comprising its client initial sequence number, that the server responds thereto by an acknowledgment of receipt of the client request with its server initial sequence number and the incremented client initial sequence number and that the client acknowledges receipt with the incremented server sequence number and client sequence number incremented again.

Ever more terminals are being installed in private communications networks or LANs (Local Area Networks). These private networks are linked to the public communication network to which the servers generally belong or to the public network ensuring the hookup between the LAN and the network environment hosting the servers by way of access device also called access gateway. The access gateway permits the accessibility of the communication terminals of the private networks of private communication remotely through a public communication network such as an open and/or shared network, in particular of Internet type. For this purpose, the access gateway ensures the interconnection between the private network hosting these terminals and the public communication network. In particular, the gateway implements functions for network address translation and functions for filtering the incoming communications entering the private communication network.

The network address translation functions (NAT or else NAT/PAT for network address to port address translation) have made it possible to limit the number of public IP addresses required in order to individually reach the various terminals connected to this network by establishing a correspondence between network addresses and port addresses. Thus, when such address translation functions are implemented, a terminal of a private communication network placed behind the access gateway is not accessible from the public communication network as long as the translation functions are not configured in the access gateway for this terminal.

In certain services, such as a telemonitoring or video monitoring service, it may be useful for the server to be able at any moment to command a video stream upload or control the motion of a camera. And, if this camera's address translation functions are not configured in the access gateway placed in front of this camera, the telemonitoring server can do nothing.

Moreover, the filtering functions implemented at the level of the access gateways making it possible to secure the private communication network in relation to the public communication network are here again in order to limit the outside accesses entering the private communication network. Therefore if these filtering functions are not configured, the telemonitoring server does not have access to the cameras allowing it to operate the monitoring.

Now, hitherto the procedures for configuring the address translation and filtering functions remain dependent on the implementations of the various gateway providers: they are therefore APIs or methods implemented in the form of proprietary computer programs. This results in difficulties, or indeed impossibilities for the service provider server to configure gateways of heterogeneous origin. The gateways can also be configured manually. However, the problematic issue of modifying the configuration of these gateways is nonetheless not solved.

Furthermore, the correspondences between the network addresses and the port addresses and the filtering are activated only in a temporary manner in most cases, the traffic stream reinitializing the temporary activation timer. This temporary activation is incompatible with certain services, in particular monitoring services, which require the server to search repeatedly (whenever, at any moment, periodically, etc.) for elements at terminals placed behind such access gateways after a long period of traffic inactivity that has caused the deactivation of the correspondences.

Mechanisms such as the heartbeat (or keepalive) mechanism make it possible maintain the crossing of the NATs and therefore the connection between the server and the client. These mechanisms are based on periodic messages exchanged between the server and the client on the initiative of the server when the service requires a permanent connection. These mechanisms pose problems of scalability, that is to say problems of dimensioning when the server dialogs for this service with a large number of clients since the server must then manage the monitoring and the maintaining of as many connections as clients.

The right to configure the translation and filtering functions of an access gateway can also be legally or contractually prohibited to the service provider, in particular when the service provider is not the owner and/or operator of the access gateway. This limits the provision of certain services only to the clients of the same access provider.

SUMMARY

A subject of an exemplary embodiment of the invention is a terminal device of a communication network comprising:

means for establishing a connection with a service provider device through at least said communication network, and application server means able to receive a service request from said service provider device on said connection.

Thus, the terminal device can make itself accessible to a service provider device as soon as it is put into service. Furthermore, the fact that the terminal device is at the initiative of the connection for a service secures access to the data of the terminal device relating to this service.

Advantageously, said communication network is a private communication network comprising an access device allowing the means for establishing a connection to establish said connection between said terminal device and said service provider device through the private and public communication networks.

Thus, the connection being an outgoing connection, it is not filtered by the access device and the terminal device can always be accessed by the service provider device to respond to a service request. In addition, the access device continues to play its role of securing the private communication network.

Furthermore, this connection allows, advantageously, bidirectional traffic between the terminal device and the service provider device.

The subject of an embodiment of the invention is also a service provider device of a communication network comprising:

connection means to allow a terminal device to establish a connection with said service provider device through at least said communication network, and means for sending a service request on said connection to application server means of the terminal device.

The subject of an embodiment of the invention is also a method for the putting into service of application server means of a terminal device of a communication network comprising the establishment of a connection by said terminal device with said service provider device through said communication network, said connection allowing said service provider device to send a service request to said application server means of said terminal device.

Advantageously, the connection establishment is renewed after each dropout of said connection between said terminal device and said service provider device.

Thus, the service provider device can always access the terminal device even after a reinitialization of the terminal device, a network dropout etc.

Advantageously, said connection is a connection in permanent mode.

Thus, if the service requires exchanges interspersed with significant silence time slots causing a connection dropout in the case of standard connection, the terminal device restores the connection with the service provider device less frequently.

Advantageously, said connection is an encrypted connection.

Thus, the data exchanged on the connection are readable only by the terminal device and by the service provider device.

Another subject of an embodiment of the invention is a computer program comprising program code instructions for the execution of the steps of the method for the putting into service of application server means of a terminal device when said program executed by a processor.

The subject of an embodiment of the invention is also a system for providing a service in a communication network comprising at least this terminal device and this service provider device.

The subject of an embodiment of the invention is also a telemonitoring system comprising at least one video camera comprising this terminal device and a videomonitoring service platform comprising this service provider device.

BRIEF DESCRIPTION OF THE DRAWINGS

The characteristics and advantages will be more clearly apparent on reading the description, given by way of example, and the figures pertaining thereto which represent.

DETAILED DESCRIPTION OF ILLUSTRATIVE EMBODIMENTS

An embodiment of the invention will be more particularly described within the framework of a videomonitoring application. Generally, it applies in any field of application where a terminal operates by exchanging data with a remote item of equipment on a service. Other applications such as remote home-automation services, security services, etc. will also be able to use an embodiment of the invention.

An embodiment of the invention proposes to provide a new structure of the devices, seen from the Client-Server architectures in terms of connectivity and application.

Figure 1:
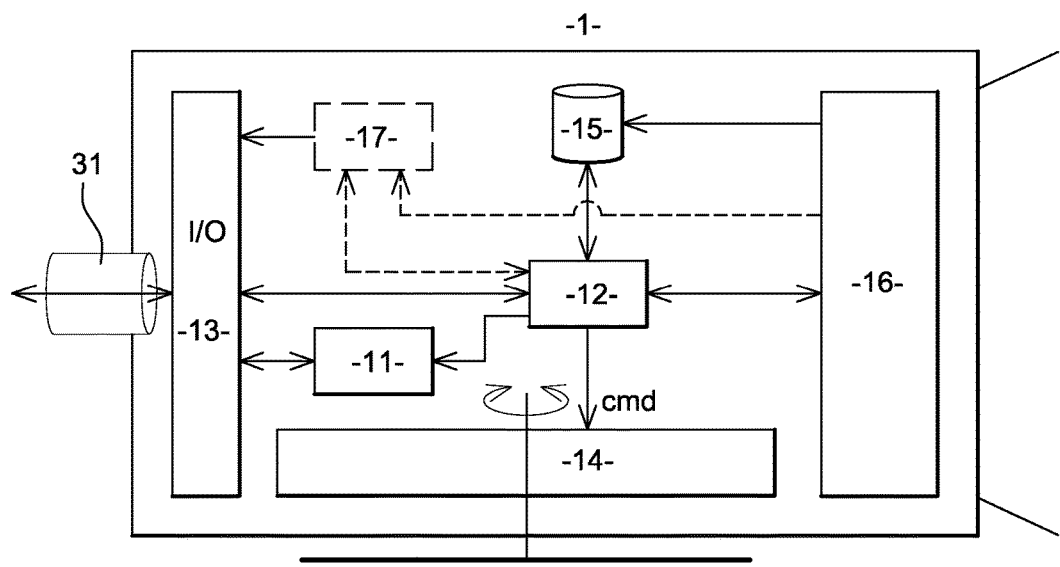
FIG. 1, a block diagram of a terminal device.

FIG. 1 illustrates an exemplary terminal device 1, in particular an IP terminal (the abbreviation standing for Internet Protocol). The terminal device operates in "server" mode at the application level by virtue of the application server 12. Thus, it is possible to dispatch a service request to the terminal device 1, in particular to its application server 12. The application server 12 of the terminal 1, once reached, responds the service request received.

In order to make provision to reach the application server 12 remotely and at any moment realizing the role of server of the application server 12, the terminal device 1 establishes a connection 31 by virtue of a device for establishing a connection 11 with a remote service provider device (not illustrated in FIG. 1).

To establish this connection, the terminal device 1 knows, prior to the establishment of the connection 31, the service provider device 2 with which it desires to establish this link, for example having previously identified it by its address. In the case of a videomonitoring application, the terminal device 1 can either receive this identification by manual input, or by direct transmission or via a network during registration with the videomonitoring service, etc.

The terminal device 1 then mixes the roles of "client" and of "server" according to the application level:

from an application service point of view (at least protocols and services, in particular http service), the terminal device 1 is in "server" mode. It comprises application servers 12 and 17, such as at least one WEB or http server 12 and, if appropriate, a streaming server 17 or any other type of application in particular Internet service such as an FTP server (not illustrated).

From a connectivity point of view, in particular TCP connectivity, the terminal device 1 is positioned in "client" mode. For this purpose, the terminal device 1 comprises a device for establishing a connection 11 which is coupled to the input/output means 13. In this case, the device for establishing a connection 11 of the terminal device 1 is at the initiative of the connection 31 of the terminal device 1.

Within the framework of the videomonitoring application, the terminal device 1 is a camera comprising capture device 16, optionally a storage device 15 for storing the captured images and a displacement device 14. Thus the application server 12 can receive requests for services such as:

video stream send requests camera displacement commands, in particular for cameras of PTZ type, requests for a previously recorded video file etc.

In the case of a video stream send request, the application server 12 can, in particular, either take responsibility for transmitting the video stream originating from the capture device 16 via the input/output device 13 and the connection 31, or order streaming-server 17 to perform this transmission of the video stream originating from the capture device 16 via the input/output device 13 and the connection 31.

In the case of a camera displacement command, the application server 12 can, in particular, transmit a command cmd to the displacement device 14 so as to orient the camera 1 with respect to the object to be filmed. Thus, the camera can constantly be controlled remotely by virtue of an embodiment of the invention.

In the case of a request for a video file, the application server 12 can, in particular, search the database 15 either for images to form a video file corresponding for example to a time slot, or for a stored video file so as to transmit it via the connection 31.

Figure 2:
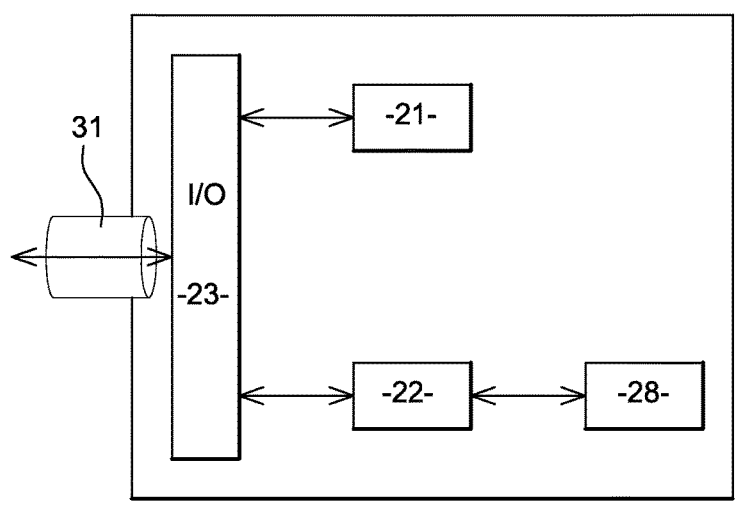
FIG. 2, a block diagram of a service platform.

FIG. 2 illustrates a service provider device 2, constituting for example, the service provider device with which the terminal device of FIG. 1 dialogs via a connection 31.

The service provider device 2 comprises connection device 21 connected to the input/output device 23 able to receive a connection establishment request and allow the establishment of the connection 31.

The service provider device 2 furthermore comprises a transmitter for sending a service request 22 by virtue of the input/output device 23 via a connection 31 to a terminal device.

In the case where the service provider device 2 constitutes a videomonitoring service, the transmitter 22 are able to send service requests such as video stream send requests camera displacement commands, in particular for cameras of PTZ type, requests for a previously recorded video file etc.

Optionally, the service request transmitter 22 also constitutes a receiver for receiving a response to said service requests.

For example, in the case of a video stream send request, the service request transmitter 22 are able to receive the requested video stream sent by the application server 13 or 17 of the terminal device 1 via the connection 31.

If appropriate, the service provider device furthermore comprises a processor connected to the service request transmitter 22 so as to receive data to be processed as a function of the responses to said service requests. The processor 28 utilizes the resources of the cameras and can comprise means for processing the image, means for searching the image for specific data, archiving means, etc.

Figure 3:
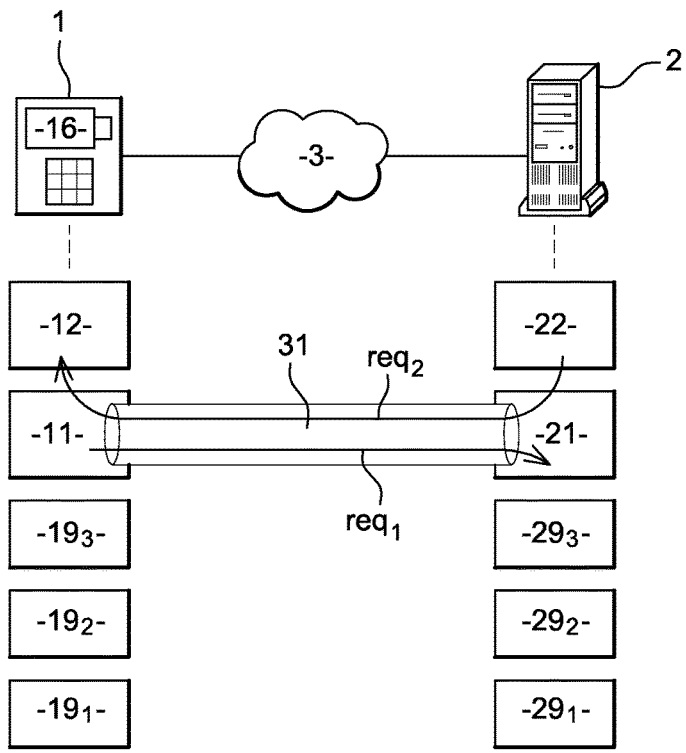
FIG. 3, an architecture diagram of a service provision system in a public communication network, FIG. 4, an architecture diagram of a service provision system with at least one terminal device placed behind an access device, FIG. 5, a diagram of the exchanges in particular during the putting into service of the application server means of a terminal device.

FIG. 3 illustrates an architecture of a service provision system in a public communication network 3.

The service provider architecture comprises:

A terminal device 1 consisting of various layers: a physical layer $19_1$, a level 2 network layer $19_2$, a level 3 network layer $19_3$, a "client" mode connection layer comprising the device for establishing a connection 11, a "server" mode application layer comprising at least application server 12. Within the framework of the video monitoring application, the terminal device 1 comprises sensor 16.

A service provider device 2 consisting of an item of equipment of the public network 3 (or shared network) remote in this network from the terminal device 1 and constituting a service platform. This service provider device 2 likewise consists of various layers: a physical layer $29_1$, a level 2 network layer $29_2$, a level 3 network layer $29_3$, a "server" mode connection layer comprising connection means 21, a "client" mode application layer comprising at least means for sending a service request 22.

The device for establishing a connection 11 of the connection layer, in particular TCP client, of the terminal device 1 sends a connection request $req_1$ to the connection means 21 of the connection layer, in particular TCP server, of the service provider device 2 (previously identified). This request $req_1$ triggers the establishment of the connection 31, in particular permanent TCP connection, of the terminal device 1 with the service provider device 2 through the network 3.

A TCP permanent connection implements, in particular, a mechanism such as the "keepalive" mechanism so as to allow permanent accessibility from the remote service provider device 2.

The permanence of the connection is at the initiative of the application server 12 for the services requiring such a connection. Thus, it is the connection establishment device 11 of the terminal device which implement the mechanisms such as "keepalive" by monitoring the connection and by regularly or periodically exchanging messages with the connection means 21 of the service provider device 2. The permanence mechanism being the responsibility of the terminal device 1, no dimensioning problem arises.

By way of this connection 31, the service provider device 2 is then able to contact the terminal device 1 at any moment in respect of a service request $req_2$ sent by its service request sending means 22 to the application server 12 of the terminal device. As connection 31 is bidirectional, it allows the application server 12 to respond to the service request $req_2$.

Figure 4:
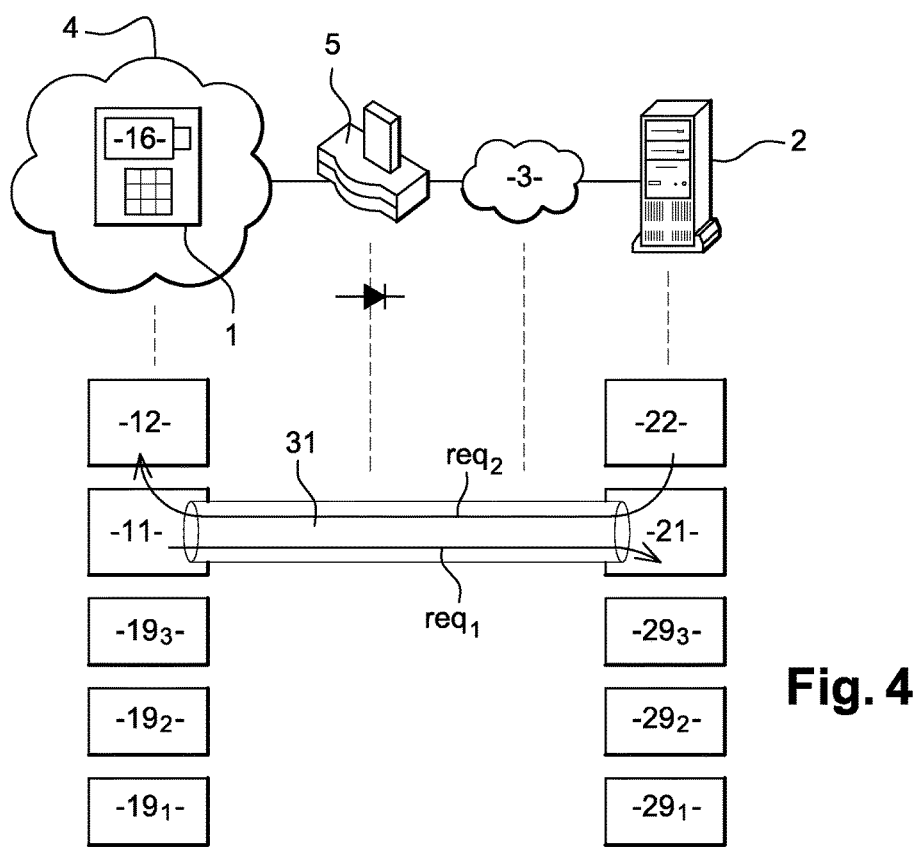

FIG. 4 illustrates an architecture of a service provision system with at least one terminal device placed behind an access device.

Here again the service provider architecture comprises:

A terminal device 1 consisting of various layers: a physical layer $19_1$, a level 2 network layer $19_2$, a level 3 network layer $19_3$, a "client" mode connection layer comprising a device for establishing a connection 11, a "server" mode application layer comprising at least application server 12. Within the framework of the video monitoring application, the terminal device 1 comprises a sensor 16.

A service provider device 2 consisting of an item of equipment of the public network 3 (or shared network) remote in this network from the terminal device 1 and constituting a service platform. This service provider device 2 likewise consists of various layers: a physical layer $29_1$, a level 2 network layer $29_2$, a level 3 network layer $29_3$, a "server" mode connection layer comprising connection means 21, a "client" mode application layer comprising at least means for sending a service request 22.

The device for establishing a connection 11 of the connection layer, in particular TCP client, of the terminal device 1 send a connection request $req_1$ to the connection means 21 of the connection layer, in particular TCP server, of the service provider device 2 (previously identified) via an access device such as a gateway (in particular an ADSL gateway such as a Box) 5 which filters the incoming information entering the local network 4 or private network or LAN (for Local Access Network). This request $req_1$ triggers the establishment of the connection 31, in particular permanent TCP connection, of the terminal device 1 with the service provider device 2 through the network 3. As request $req_1$ is an outgoing request, it is not filtered by the access device and thus allows the systematic establishment of the connection 31 which would not be the case if the connection establishment request originated from the service provider device 2.

By way of this connection 31, the service provider device 2 is then able to contact the terminal device 1 at any moment in respect of a service request $req_2$ sent by its service request sending transmitter 22 to the application server 12 of the terminal device. Indeed, once the connection 31 with the service provider device 2 is established, the incoming requests originating from the service provider device 2 via this connection 31 are automatically authorized to enter the local network 4 by the access device 5.

The use of an access device 5 allows global filtering, for example NAT, of the incoming requests entering the private communication network 4 and limits the risks of intrusion, in particular by deploying a process for identifying the remote service provider device 2 (process prior to the establishment of a connection 31 such as envisaged in the literature in respect of the crossing of the NATs during TCP connection establishment).

The establishment of the connection 31 on the initiative of the terminal device 1 makes it possible to configure a correspondence table or IP address mapping in accordance with the general operating principles of the NATs in the access device 5. This mapping retains the benefit of using only a single IP address, the public IP address of the access device 5, to reach the terminal. Thus, within the framework of our application, the addressing of the cameras is conditioned by the use of a single public IP address, in this instance that of the access device 5: the ADSL gateway. The solution is compatible whatever the access device.

The use of a connection 31 made secure by encryption, in particular encrypted TCP connection SSL and associated protocols (TLS, DTLS), makes it possible to strengthen the security of the transmission, in particular to guarantee the confidentiality of the videos, while using the same principle of an embodiment of the invention of server client inversion between the connection layer (11 on the terminal device side and 21 on the service provider device side) and the application layer (12 on the terminal device side and 22 on the service provider device side).

Figure 5:
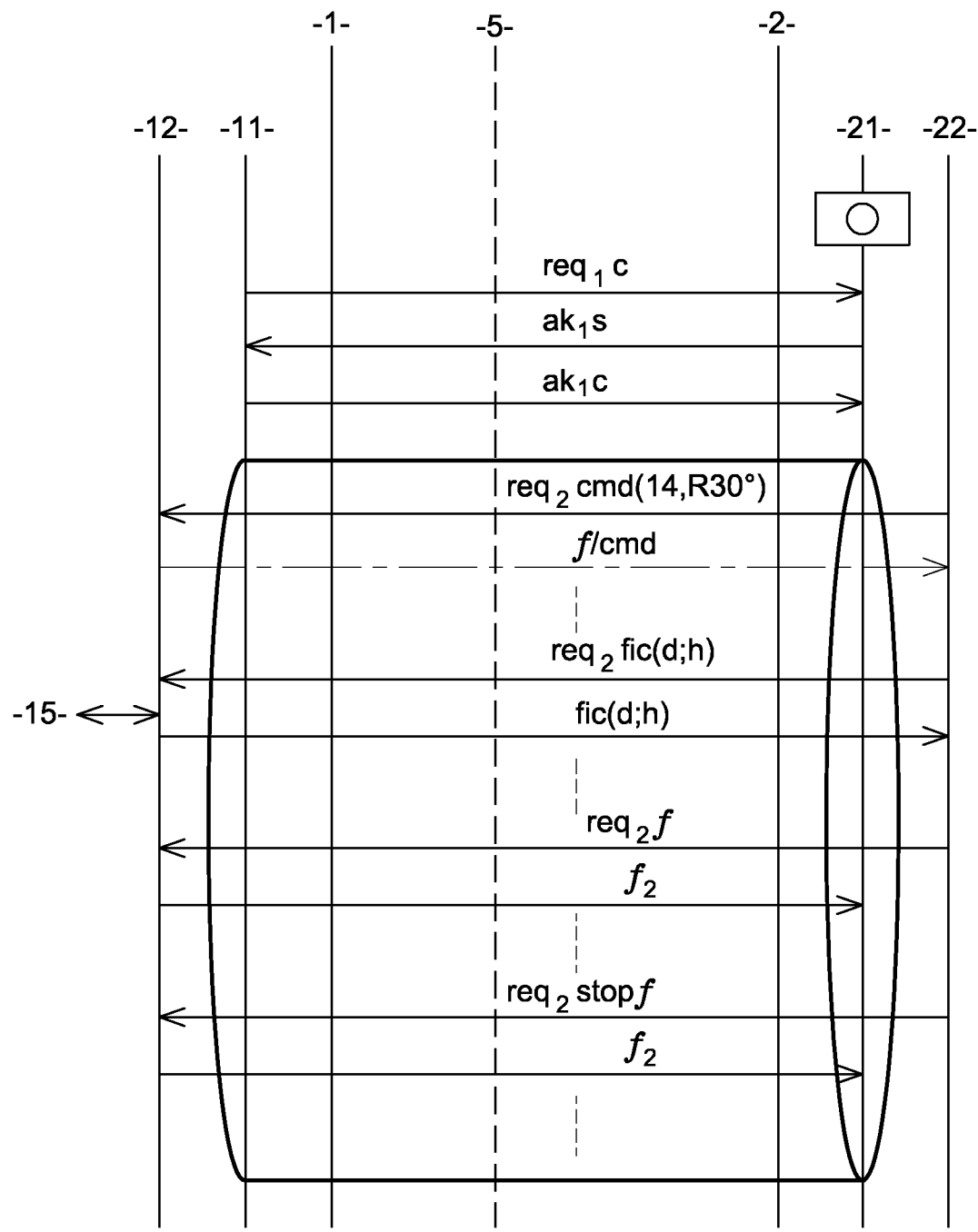

FIG. 5 illustrates exchanges, in particular during the putting into service of the application server 12 of a terminal device 1. During the putting into service of the application server 12 which takes place, for example, during the putting into service of the terminal device 1, during the reinitialization of the terminal device 1, after a network dropout, etc., the device for establishing a connection 11 of the terminal device transmit via the access device 5 on the network 3 to a previously identified service provider device 2 a connection establishment request $req_1$ c. As means of connection 21 of the service provider device 21 are in passive opening O, they are listening to such a request and respond thereto $ack_1$ s. Subsequent to the response $ack_1$ c of the connection establishment device 11 of the terminal device to the response of the service provider device 2, the connection is established represented in the figure by the tunnel between the connection layers 11 of the terminal device 1 and 21 of the service provider device 2.

By this connection, the service provider device 2 by its service request sending transmitter 22 can transmit requests for services to the application server 12 of the terminal device 1, such as:

displacement commands for the camera constituting the terminal device 1 $req_2$ cmd (14, R30°) (here, command for translation by 14 units and for rotation to the right by 30°) to which the application server 12 can respond, for example, by transmitting the stream of the displaced camera f/cmd;

requests for a previously recorded video file $req_2$ fic(d,h) to which the application server 12 respond by transmitting the requested file fic(d,h);

video stream send requests $req_2$ f to which the application server 12 respond by transmitting the requested stream f2 (an end-of-stream request req2 stop f of the service request sending transmitter 22 making it possible to end the transmission of the stream);

etc.

The principle used by an embodiment of the invention to make the terminal device establish the connection so as thereafter to receive service requests from a service provider device make it possible to establish, for this identified service provider device, permanent and secure accessibility to the terminal device via in particular an open (Internet) or shared network. Furthermore, the proposed solution is independent of the gateways and transparent to the latter and scalable.

In the case of terminal devices belonging to private communications networks and placed behind access devices, an embodiment of the invention affords, within the framework of service provision calling upon such terminals, a universal response to the problematic issue of crossing of the NATs.

Although the present disclosure has been described with reference to one or more examples, workers skilled in the art will recognize that changes may be made in form and detail without departing from the scope of the disclosure and/or the appended claims.

The invention claimed is:

1. A terminal device of a communication network, the terminal device comprising:
    a client mode connection layer;
    a server mode application layer;
    means for initiating and establishing a persistent connection, said means for initiating and establishing a persistent connection sending from the client mode connection layer of the terminal device a connection establishment request to a server mode connection layer of a service provider device through at least said communication network, using an identity of the service provider device known to the terminal device prior to establishment of the persistent connection, the terminal device being separated from said service provider by a gateway device operable to perform network address translation (NAT) wherein the terminal device initiates and establishes the persistent connection before being triggered to send information to the service provider device and wherein the client mode connection layer of the terminal device persists the persistent connection by periodically sending keep alive messages to the service provider device so that the persistent connection is available for the service provider device to send service requests to the server mode application layer, and
    application server means of the server mode application layer of the terminal device for receiving through the gateway a service request from a client mode application layer of said service provider device on said persistent connection established through the client mode connection layer of the terminal device, said service provider device operating as a client to the application server means.

2. The terminal device as claimed in claim 1, wherein said communication network is a private communication network and wherein the gateway device allows the means for establishing a connection to establish said connection between said terminal device and said service provider device through the private communication network and a public communication network.

3. A service provider device of a communication network comprising:
    connection means for allowing a terminal device to send a request to establish a persistent connection on a client mode connection layer of the terminal device using an identity of the service provider device to initiate and establish a persistent connection with a server mode connection layer of said service provider device through at least said communication network, the terminal device being separated from said service provider by a gateway device operable to perform network address translation (NAT) wherein the terminal device initiates and establishes the persistent connection before being triggered to send information to the service provider device and wherein a client mode connection layer of the terminal device persists the persistent connection by periodically sending keep alive messages to the service provider device so that the persistent connection is available for the service provider device to send service requests to a server mode application layer of the terminal device, and
    means for sending a service request from a client mode application layer of the service provider device, on said persistent connection established through the server mode connection layer of the service provider device, to an application server of the server mode application layer of the terminal device through the gateway device, the service provider device operating as a client to the application server.

4. A method of putting into service an application server of a terminal device of a communication network, the method comprising:
    initiating and establishing by said terminal device a persistent connection with a service provider device through said communication network by sending a request for establishment of a persistent connection on a client mode connection layer of the terminal device using an identity of a service provider device known to the terminal device prior to establishment of the persistent connection, the terminal device being separated from said service provider device by a gateway device operable to perform network address translation (NAT), said connection being suitable for transmitting a service request from said service provider device wherein the terminal device initiates and establishes the persistent connection before being triggered to send information to the service provider device and wherein the client mode connection layer of the terminal device persists the persistent connection by periodically sending keep alive messages to the service provider device so that the persistent connection is available for the service provider device to send service requests to a server mode application layer of the terminal device;
    receiving from a client mode application layer of said service provider device a service request by said application server of said terminal device through the persistent connection established through the client mode connection layer of the terminal device, the service request being received by the application server on the server mode application layer of the terminal device.

5. The method of claim 4, and further comprising:
    renewing the establishment of the connection after each dropout of said connection between said terminal device and said service provider device.

6. The method of claim 4, wherein said connection is a connection in permanent mode.

7. The method of claim 4, wherein said connection is an encrypted connection.

8. A computer program comprising program code instructions stored on a non-transitory computer-readable medium for execution of a method for putting into service an application server of a terminal device of a communication network, when said program is executed by a processor, wherein the method comprises:
    initiating and establishing by said terminal device a persistent connection with a service provider device through said communication network by sending a request for establishing a persistent connection on a client mode connection layer of the terminal device using an identity of a service provider device known to the terminal device prior to establishment of the persistent connection, the terminal device separated from said service provider by a gateway device operable to perform network address translation (NAT) wherein the terminal device initiates and establishes the persistent connection before being triggered to send information to the service provider device and wherein the client mode connection layer of the terminal device persists the persistent connection by periodically sending keep alive messages to the service provider device so that the persistent connection is available for the service provider device to send service requests to a server mode application layer of the terminal device, receiving from a client mode application layer of said service provider device a service request by said application server of said terminal device through the gateway device and the persistent connection established by the client mode connection layer of the terminal device, the service request being received by the application server on the server mode application layer of the terminal device, said service provider device operating as a client to the application server.

9. A system for providing a service in a communication network comprising:
   at least one service provider device comprising a server mode connection layer and a client mode application layer; and
   at least one terminal device comprising:
      a client mode connection layer,
      a server mode application layer,
      means for establishing a persistent connection with said service provider device wherein the means for establishing the persistent connection initiates the persistent connection by sending a request for a connection establishment on the client mode connection layer to the service provider device using an identity of the service provider device known to the terminal device prior to establishment of the persistent connection wherein the terminal device initiates and establishes the persistent connection before being triggered to send information to the service provider device and wherein the client mode connection layer of the terminal device persists the persistent connection by periodically sending keep alive messages to the service provider device so that the persistent connection is available for the service provider device to send service requests to the server mode application layer, and
      an application server configured to receive a service request on the server mode application layer from said service provider device on said persistant connection, the terminal device being separated from said service provider by a gateway device operable to perform network address translation (NAT);
   wherein the service provider device comprises connection means for allowing the terminal device to establish the connection with said service provider device on the server mode connection layer through at least said communication network, and means for sending the service request on said connection to the application server of the terminal device through the gateway device, said service provider device operating as a client on the client mode application layer to the application server of the terminal device.

10. A telemonitoring system comprising:
   at least one video camera comprising capture means;
   a terminal device connected to the at least one video camera and comprising:
      a client mode connection layer;
      a server mode application layer;
      means for initiating and establishing a persistent connection with a server mode connection layer of a service provider device through at least a communication network, wherein the means for initiating and establishing the persistent connection sends a request for an establishment of the persistent connection to the service provider on the client mode connection layer of the terminal device using an identity of the service provider device known to the terminal device prior to establishment of the persistent connection, the terminal device being separated from said service provider by a gateway device operable to perform network address translation (NAT) wherein the terminal device initiates and establishes the persistent connection before being triggered to send information to the service provider device and wherein the client mode connection layer of the terminal device persists the persistent connection by periodically sending keep alive messages to the service provider device so that the persistent connection is available for the service provider device to send service requests to the server mode application layer, and
      application server configured to receive through the gateway a service request at the server mode application layer of the terminal device from a client mode application layer of said service provider device on said persistent connection established through the client mode connection layer of the terminal device, said service provider device operating as a client to the application server; and
   a video monitoring service platform comprising the service provider device, wherein the service provider device comprises connection means for allowing the terminal device to establish the connection with said service provider device through at least said communication network, and means for sending the service request on said connection to the application server of the terminal device through the gateway, said service provider device operating as a client to the application server.

* * * * *